United States Patent [19]

Sibbertsen

[11] Patent Number: 4,818,178
[45] Date of Patent: Apr. 4, 1989

[54] PROCESS FOR COOLING THE BLADES OF THERMAL TURBOMACHINES

[75] Inventor: Walter Sibbertsen, Hamburg, Fed. Rep. of Germany

[73] Assignee: Marresearch Gesellschaft fuer Forschung und Entwicklung GmbH, Hamburg, Fed. Rep. of Germany

[21] Appl. No.: 117,202

[22] PCT Filed: Jan. 23, 1987

[86] PCT No.: PCT/EP87/00029
§ 371 Date: Nov. 18, 1987
§ 102(e) Date: Nov. 18, 1987

[87] PCT Pub. No.: WO87/04776
PCT Pub. Date: Aug. 13, 1987

[30] Foreign Application Priority Data

Feb. 4, 1986 [DE] Fed. Rep. of Germany ....... 3603350

[51] Int. Cl.$^4$ .............................................. F01D 5/18
[52] U.S. Cl. ................... 415/115; 416/97 R; 60/39.29
[58] Field of Search ............. 415/115, 116; 416/96 R, 416/96 A, 97 R, 97 A; 60/39.29, 39.75

[56] References Cited

U.S. PATENT DOCUMENTS

| | | | |
|---|---|---|---|
| 2,893,214 | 7/1959 | Hendal | 137/116 |
| 2,955,432 | 10/1960 | Hardebol et al. | 62/5 |
| 3,173,273 | 3/1965 | Fulton | 62/5 |
| 3,361,336 | 1/1968 | Foa | 417/53 |
| 3,550,372 | 12/1970 | Craig | 416/96 R |
| 4,330,235 | 5/1982 | Araki | 416/97 R |
| 4,540,339 | 9/1985 | Horvath | 416/97 R |

FOREIGN PATENT DOCUMENTS

| | | | |
|---|---|---|---|
| 605691 | 11/1934 | Fed. Rep. of Germany . | |
| 858260 | 12/1952 | Fed. Rep. of Germany . | |
| 2375910 | 7/1978 | France . | |
| 1028896 | 7/1983 | U.S.S.R. | 415/115 |
| 1138524 | 2/1985 | U.S.S.R. | 416/97 R |
| 829727 | 3/1960 | United Kingdom . | |

Primary Examiner—Robert E. Garrett
Assistant Examiner—John T. Kwon
Attorney, Agent, or Firm—Sixbey, Friedman, Leedom & Ferguson

[57] ABSTRACT

Cooling air flows over the inner wall of the blade, and emerges through small orifices provided in the blade jacket in the region of the boundary layer. The cooling air is admitted tangentially into an eddy tube provided with a closure and with a throttle in the region of the latter. The cooling air flow, which is cooled after flowing through the closure is fed into the blades and, after passing over the inner wall of the blade jacket, escapes from each blade in the region of the boundary layer. The heated air flow which escapes from the throttle is evacuated from the blade region. This airflow can be mixed with the cooling air or be introduced into the main gas flow.

30 Claims, 3 Drawing Sheets

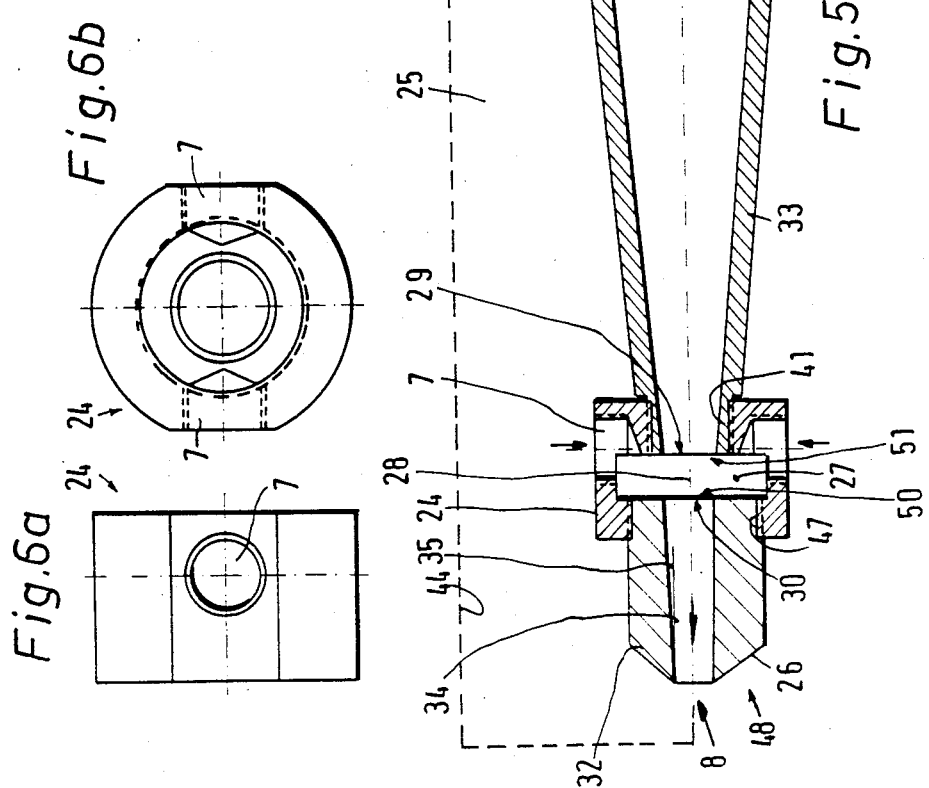

PROCESS FOR COOLING THE BLADES OF THERMAL TURBOMACHINES

The invention relates to a method for cooling heat-stressed structural elements of turbomachines, an apparatus for the implementation of the said method, and a design for heat-stressed blades, in which cooling air flows past the inner wall of the blade and emerges through small openings in the casing of the blade in the vicinity of the boundary-layer.

In the case of stationary turbomachines, and those installed in land-, sea- and air-vehicles are drive-units, the fact that specific structural elements, such as blades and combustion-chambers, are highly stressed by a flow of hot gas frequently creates problems. In an aircraft power-plant, for example, both rotor- and stator-blades are swept by a flow of hot gas, the temperature of which may amount to 1380° C., for example, in the starting phase and to 1170° C. during cruising flight. At these temperatures the blades need cooling, so that they are not damaged, or even destroyed, by heat-stress. To this end, cooling air, at a temperature of 585° C. during the starting phase and 470° C. during crusing flight, and at a pressure of 29 and 11 bars respectively, is taken from the high-pressure compressor, for example and is delivered to the blades by means of a special insert.

It is the purpose of the invention to indicate a method and an apparatus whereby the specific cooling power for cooling the heat-stressed structural elements of turbomachines is increased without the need of separate power-driven cooling units.

According to the invention, this purpose is accomplished in that cooling air flows tangentially into a vortex-tube consisting of a cylindrical vortex-chamber having two choke-elements at the end-sections at a location between the said choke-elements that is in the vicinity of a one of said choke-element that has an orifice-plate-like inflow section. The flow, after entering the vortex-tube, is divided into two partial flows of cooling air, one of which, after flowing through the choke-element with the orifice-plate-like inflow-section, is cooled in relation to the temperature of the cooling air flowing into the said vortex-tube and is fed to the wall-surface to be cooled, while the other partial flow of cooling air is led away from the area of the structural elements. The structural elements to be cooled may be the combustion-chambers and/or the blades. The partial flow of heated cooling air emerging from the one choke-element may be fed to the main flow of gas. This not only lengthens the life of the blades, but also reduces the operating costs of the turbomachine. In the case of aircraft power-plants, for example, this arrangement makes it possible to increase the temperature of the main flow of gas, thus improving the efficiency of the power-plant. Alternatively, it is possible to increase the temperature of the combustion-chamber, thus increasing the efficiency of the turbomachine; or the blades may be located nearer to the combustion-chamber nozzles, making it possible to reduce the size and weight of the turbomachines or to use a less costly material for the blades. This again reduces costs.

It is also possible to use a vortex-tube with a diffusor. The result of this is that the air emerging from the two end-sections is colder than the air fed to the vortex-tube. The length of the said vortex-tube, and the magnitude of the diffusor-angle are dependent upon the predetermined pressure-difference, upon the gas-throughput, upon the temperature of the gas passed through, and upon the extent of the desired drop in temperature. In the case of a vortex-tube with a diffusor, the cooling air is also introduced tangentially into a cylindrical section of the vortex-tube, whereupon a partial flow of cooling air flows through the diffusor while the remaining partial flow of cooling air flows through an orifice-plate-like choke-element. The partial flows of cooled cooling air may be combined again and may be passed to the wall-surfaces to be cooled.

Additional characteristics of the invention are described in greater detail below in conjunction with the example of embodiment illustrated in the drawings attached hereto, wherein:

FIG. 5 shows another design of vortex-tube for cooling heat-stressed components of turbomachines;

FIGS. 6a and 6b show a plan view and a side elevation of the vortex-chamber housing of the vortex-tube according to FIG. 5.

Figure 1:
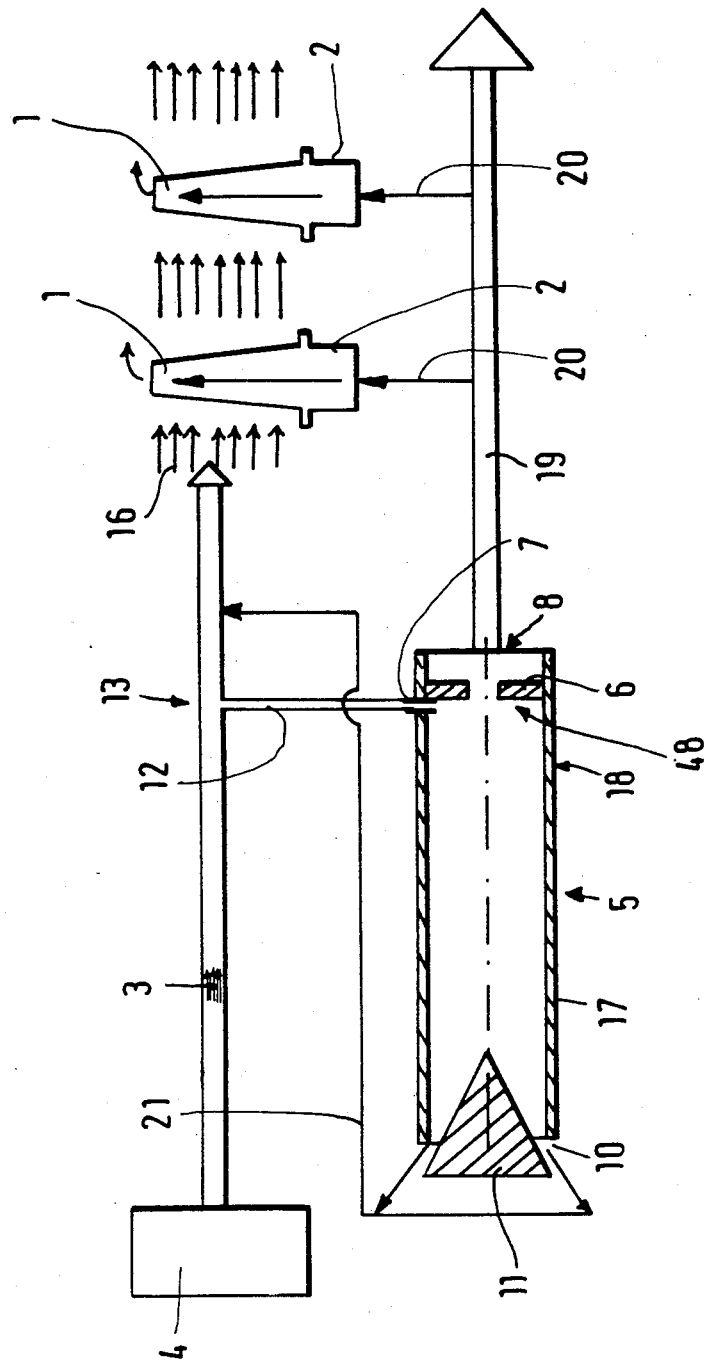
FIG. 1 is a diagrammatical view of an apparatus for cooling blades.

FIG. 1 is a diagrammatical representation of an apparatus for cooling blades. Cooling air from a source 4, for example a compressor, is injected, through the main gas-flow channel 13 and a cooling-air channel 12, tangentially into tube 18 of a vortex-tube 5, in the vicinity of orifice-plate 6. Tube 18 forms a vortex-chamber 17. Main gas-flow channel 13 may carry, for example, compressor-air which is used as a flow of cooling air for the aircraft power-plants. Tangentially directed inflow-nozzles 7, in the vicinity of orifice-plate 6, produce a spiral flow of air into tube 18 of vortex-tube 5. The latter comprises, in addition to orifice-plate 6, a nozzle-like choke-element 11 which is located at the end of tube 18 remote from orifice-plate 6. The vortex of air formed in tube 5 consists of a core and an outer zone, the temperature of the core being lower, and that of the outer zone being higher, than the inlet-temperature of the cooling air entering through inflow-nozzles 7. The colder gas leaves vortex-tube 5, through orifice-plate 6, directly adjacent the said inflow-nozzles 7. A pipeline 19 runs from cold-air outlet 8, through connecting-pieces 20, to blades 1. Hot-air outlet 10 is located at nozzle-like choke-element 11 and may be connected, by means of a pipe 21, to main gas-flow channel 13, for example.

Figure 3:
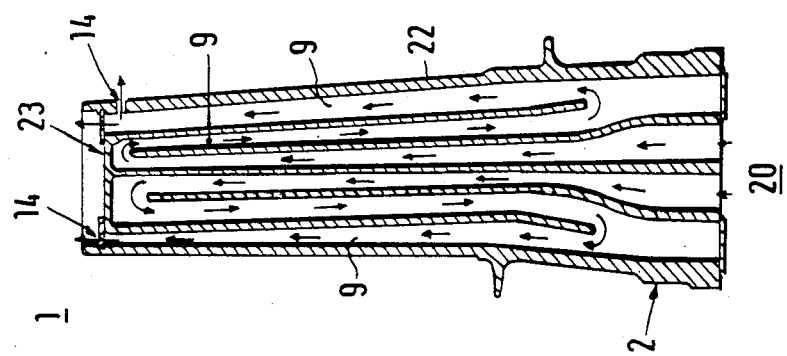
FIGS. 2 and 3 are diagrammatical side elevations, in cross-section, of two blades.
Figure 2:
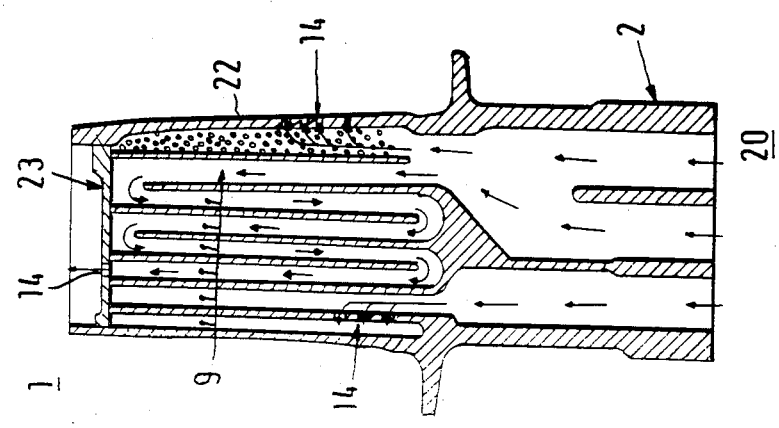

Blades 1 may be those normally used for the high-, medium- and low-pressure areas of turbomachines (FIGS. 2 and 3). The said blades consist of a hollow body containing a labyrinth cooling channel 9 comprising a plurality of flow-deflecting zones. Located at specific points in the casing 22 of the blade, and in end-cap 23, are openings 14 from which cooling air can flow from the interior of the blade. Openings 14 are preferably located in the leading edge of the blade, the pressure of the emerging cooling air being selected so that a boundary-layer flow is formed on the outer surface of the relevant blade.

It is possible to provide a vortex-tube 5 for each of the rotor- and/or stator-blades of a power-plant stage. Moreover, a number of rotor- and/or stator-blades of a power-plant stage may also be connected to the cold-air outlet from one vortex-tube 5. In the case of larger power-plants it is desirable to provide one vortex-tube 5 for each rotor- and/or stator-blade of a power-plant stage, so that cold-air outlet 8 from a vortex-tube is connected to one blade only.

It is also possible to provide a vortex-tube 5 in each blade, the said tube being provided with cooling air, from cooling-air flow 3, through cooling-air channel 12. Even with this arrangement, the air, which is cooled still further after flowing through orifice-plate 6, enters cooling channels 9 in blade 1 and thus cools blade-casing 22. The emerging cooling air flows out of the blade through openings 14 and may be mixed with the flow of gas, for example. Hot air emerging from outlet 10 on the choke side is carried away and may also be mixed with the flow of gas, for example.

Figure 4:
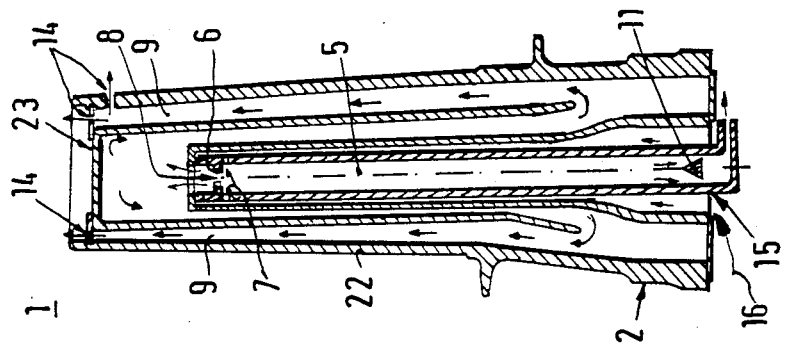
FIG. 4 is a diagrammatical side elevation, in cross-section, of another blade.

As shown in FIG. 4, vortex-tube 5 may be in the form of an insert 15 fitted into a blade 1. Cooling air emerging from outlet 8 is introduced into cooling channels 9. Hot air emerging from outlet 10 is fed to main gas-flow channel 13 in the area which the main flow of gas 16 flows.

A doubled-walled annular combustion-chamber may also be cooled in a similar manner by means of one or more vortex-tubes 5. In this case the flow of cooling air is fed into the circular channel of the annular combustion-chamber which may be divided into separate cooling channels by means of separating webs. The compressed air required for the revelant vortex-tube is either taken from the cooling air used to cool the annular combustion-chamber, or is obtained in the manner described for cooling the blades.

According to another configuration of the invention, it is possible to use, for the foregoing applications, vortex-tubes 25 in which hot-air outlet 10 is changed, by a diffusor 33, into a cold-air outlet 8a. Vortex-tube 25, illustrated diagrammatically in FIGS. 5 to 6b, has the advantage that air emerging from the end-sections of the said vortex-tube is colder than the air fed thereto. The length of the vortex-tube, and the angle of the diffusor, are dependent upon the predetermined pressure-difference, in gas-throughout, the temperature of the gas introduced, and the desired drop in temperature. The vortex-tube illustrated in FIG. 5 comprises a vortex-chamber housing 24 containing a vortex-space 27, the latter being in communication with inflow-nozzles 7 arranged tangentially of vortex-chamber housing 24. The said vortex-space also comprises two flow-outlet apertures 29, 30 arranged coaxially with centreline 28 of housing 24. Aperture 29 forms an orifice-plate-like inflow-section 51 of a diffusor 33, since the diameter of the inflow-apperture of diffusor 33, i.e. that of flow-outlet aperture 29, is smaller than the diameter of vortex-space 27. If desired, it is also possible for the diameter of flow-outlet aperture 29 to be equal to that of vortex-space 27, in which case said aperture 29 would not form an orifice-plate-like inflow-section. Diffusor 33 has a threaded end 41 which is screwed into vortex-chamber housing 24. The slope of diffusor 33 may be as 1:10. End-section 36 of the said diffusor comprises a flange 31 having an external thread 37. The said flange also contains a recess 38 for the accommodation of an orifice-plate 6. The latter is fitted into the flange, being held therein by a flange 39 which is screwed to flange 31. A pipe-connector 40 is fitted to flange 39 as a cold-air outlet 8a. Orifice-plate-like choke-element 49, formed by flange 39 with pipe-connector 40 and orifice-plate 6, may also be of some other design, for example it is possible to use only one orifice-plate 6 for only one pipe-inlet 53 with a flange 39 and a pipe-connector 40.

Flow-outlet aperture 30 forms orifice-plate-like inflow-section 50 of an orifice-plate-like choke-element 48 which is formed by a nozzle 32. Nozzle-body 26 is screwed into a recess 47 in vortex-chamber housing 24. the partial flow of air flowing through flow-outlet aperture 30 is carried away, through nozzle-channel 34 in nozzle 32, to cold-air outlet 8. Nozzle-angle 35 may be between 3 and 5 degrees, for example.

I claim:

1. A method for cooling heat-stressed structural elements of turbomachines, in which cooling air flows past wall-surfaces of the structural elements to be cooled, subjected to heat, of said structural elements, wherein the cooling air flows tangentially into a vortex-tube consisting of a cylindrical vortex-chamber, having two choke-elements at the end-sections, at a location between the said choke-elements that is in the vicinity a one of said choke-elements that is provided with an orifice-plate-like inflow-section, and wherein the flow after entering the vortex-tube is divided into two partial flows of cooling air, one of which, after flowing through the choke-element with an orifice-plate-like inflow-section, is cooled in relation to the temperature of the cooling air flowing into said vortex-tube and is fed to the wall surfaces to be cooled, while the other partial flow of cooling air is led away from the vicinity of the structural elements.

2. A method according to claim 1, wherein the other partial flow of cooling air flows through a nozzle-like choke-element and flows out of the vortex-tube heated in relation to the temperature of the cooling air flowing into the said vortex-tube.

3. A method according to claim 2, wherein the partial flow of heated cooling air flowing out through the choke-element is mixed with the cooling air or is passed to the main flow of gas.

4. A method according to claim 1, wherein other partial flow of cooling air flows out of the vortex-tube, through a choke-element in the form of a diffusor, at a temperature equal to or less than that of the cooling air flowing into the said vortex-tube.

5. A method according to claim 4, wherein the other partial flow of cooling air flows out of the vortex-tube through a diffusor having at least one of an orifice-plate-like inflow-section and a choke-like outflow-section.

6. A method according to claim 1, wherein the partial flows of cooling air emerging from the vortex-tube are united into a single flow of cooling air which is passed to the wall-surfaces to be cooled.

7. A method according to claim 1, for cooling heat-stressed blades of turbomachines, in which cooling air is introduced into the blades, flows through ducts past an inner wall of a blade-casing, and emerges through small openings in the said blade-casing in a boundary-layer area, wherein the partial flow of cooled cooling air emerging from the vortex-tube passes through rotor and stator blades of a turbomachine stage.

8. A method according to claim 7, wherein the partial flow of cooled cooling air flows through a number of rotor- and/or stator-blades of the turbomachine stage.

9. A method according to claim 7, wherein the partial flow of cooled cooling air, from a vortex-tube flows through each blade of the turbomachine stage.

10. A method according to claim 7, wherein in each blade of the turbomachine stage, a vortex-tube is used and is acted upon by cooling air, emerging from the said vortex-tube, flowing through the blades.

11. A method according to claim 7, wherein the flow of cooling air, from a vortex-tube, flows through a number of blades of the turbomachine stage.

12. A method according to claim 7, wherein the flow of cooling air, from a vortex-tube, flows through each blade of the turbomachine stage.

13. A method according to claim 7, wherein in each blade of the turbomachine stage, a vortex-tube is used and is acted upon by cooling air, emerging from the said vortex-tube, flowing through the blades.

14. An apparatus according to claim 13, wherein a predetermined number of blades, comprising cooling channels, of a turbomachine stage are connected to one of the cold-air outlet and a mixed cooling-air outlet of the vortex-tube.

15. A method according to claim 1, for cooling heat-stressed blades of turbomachines, in which cooling air is introduced into the blades, flows through ducts past an inner wall of a blade-casing, and emerges through small openings in the said blade-casing in a boundary-layer area, wherein the flow of cooling air passes through only stator blades of a turbomachine stage.

16. A blade for a turbomachine which, when the said engine is in operation, is heat-stressed and which is adapted to be cooled with cooling air through cooling channels formed in said blade, the said cooling air emerging through small openings in the wall of the blade, wherein a vortex-tube is arranged in the blade, inflow-nozzles of the vortex-tube being arranged tangentially in the vicinity of an orifice-plate-like choke-element and being connected to a cooling-air channel in a manner for dividing cooling air from said cooling-air channel into a partial flow of cooling air that is directed through said choke-element so as to be cooled still further and passed into cooling channels in said blade, and into a remaining partial flow of cooling air that is directed in a manner so as to emerge through a hot-air outlet of a nozzle-like choke-element as hot air.

17. A blade for a turbomachine which, when said engine is in operation, is heat-stressed and which is adapted to be cooled with cooling air through cooling channels formed in said blade, the said cooling air emerging through small openings in the wall of the blade, wherein a vortex-tube with a vortex-chamber housing having tangentially aligned inflow-nozzles that are connected to a cooling-air channel is arranged in the blade, and wherein a vortex-space of the vortex-chamber housing comprises two flow-outlet apertures that are arranged coaxially with respect to a centreline of the vortex-chamber housing, one of the said apertures being connected to a diffusor and the other to an orifice-plate-like choke-element.

18. A blade according to claim 17, wherein the diffusor has an orifice-plate-like inflow-section and an outflow side of an end-section of the diffusor has a further orifice-plate-like choke element.

19. A blade according to claim 17, wherein a further orifice-plate-like choke-element is arranged on the outflow side of the end-section.

20. A blade according to claim 19, wherein a vortex-tube is formed in an insert-piece which is inserted into the blade.

21. An apparatus for cooling a heat-stressed structural element of a turbomachine, in which cooling air flows past wall surfaces thereof, and is subjected to heat, wherein:
a source of cooling air is connected to a vortex-tube in which tangentially directed inflow-nozzles for cooling air are provided for directing cooling air into a chamber of the vortex-tube between an orifice-plate-like choke-element and a nozzle-choke element,
a cold air outlet located downstream of said orifice-plate-like choke-element is connected to cooling channels in the heat-stressed structural element,
and a hot-air outlet of the nozzle-like choke-elements is connected to a gas flow channel downstream of a combustion-chamber.

22. An apparatus according to claim 21, wherein said channel is a cooling-air channel.

23. An apparatus according to claim 21, wherein said channel is a main gas-flow channel.

24. An apparatus according to claim 21, wherein the source of cooling air is connected to inflow-nozzles arranged tangentially of a vortex-chamber housing of the vortex-tube, and wherein the vortex-space of the vortex-chamber housing comprises two flow-outlet apertures arranged coaxially with the centreline thereof, one of the said apertures being associated with an orifice-plate-like choke-element and the other with a choke-element in the form of a diffusor.

25. An apparatus according to claim 24, wherein the choke-element is in the form of one of an orifice-plate and a nozzle having an orifice-plate-like inflow-section.

26. An apparatus according to claim 24, the diffusor comprises an orifice-plate-like inflow-section.

27. An apparatus according to claim 24, wherein an orifice-plate-like choke-element is arranged at an outflow end-section of the diffusor.

28. An apparatus according to claim 27, wherein the choke-element is in the form of one of an orifice-plate with at least one opening and a tubular inlet, a tubular connection of which has a cross-section which is smaller than an outflow cross-section of the diffusor, and which is inserted into a flange covering the end-section of the said diffusor.

29. An apparatus according to claim 24, wherein the cold-air outlet arranged after the orifice-plate-like choke-element, and the cold-air outlet from the orifice-plate-like choke-element, are connected together to form a mixed cooling-air outlet.

30. An apparatus according to claim 21, wherein each blade comprises cooling channels of a turbomachine stage and is connected to one of the cold-air outlet and a mixed cooling-air outlet of the vortex-tube.

* * * * *